Figure 1:
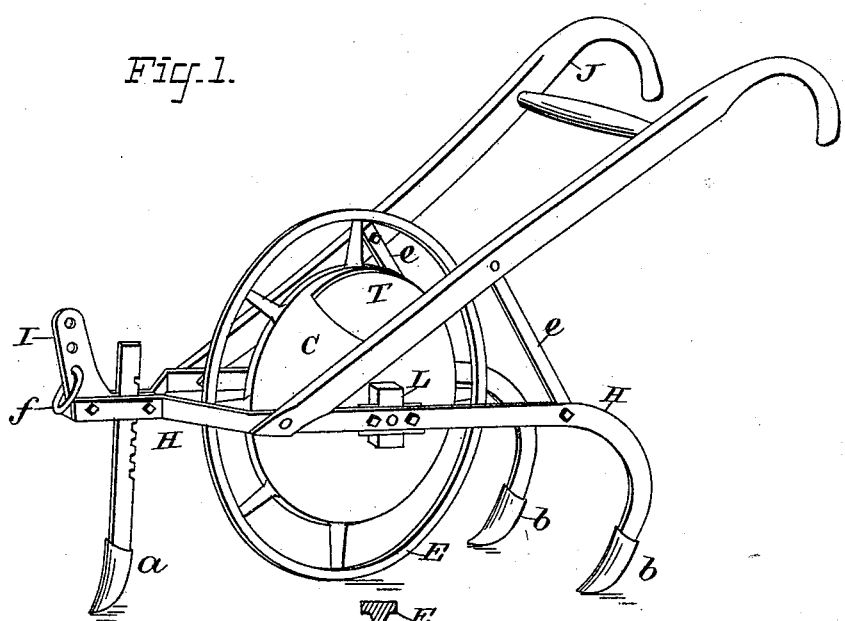

(No Model.) 2 Sheets—Sheet 1.

L. S. FLATAU.
SEED PLANTER.

No. 464,741. Patented Dec. 8, 1891.

ATTEST:

INVENTOR:
L. S. Flatau
By J. N. McIntire
Attorney

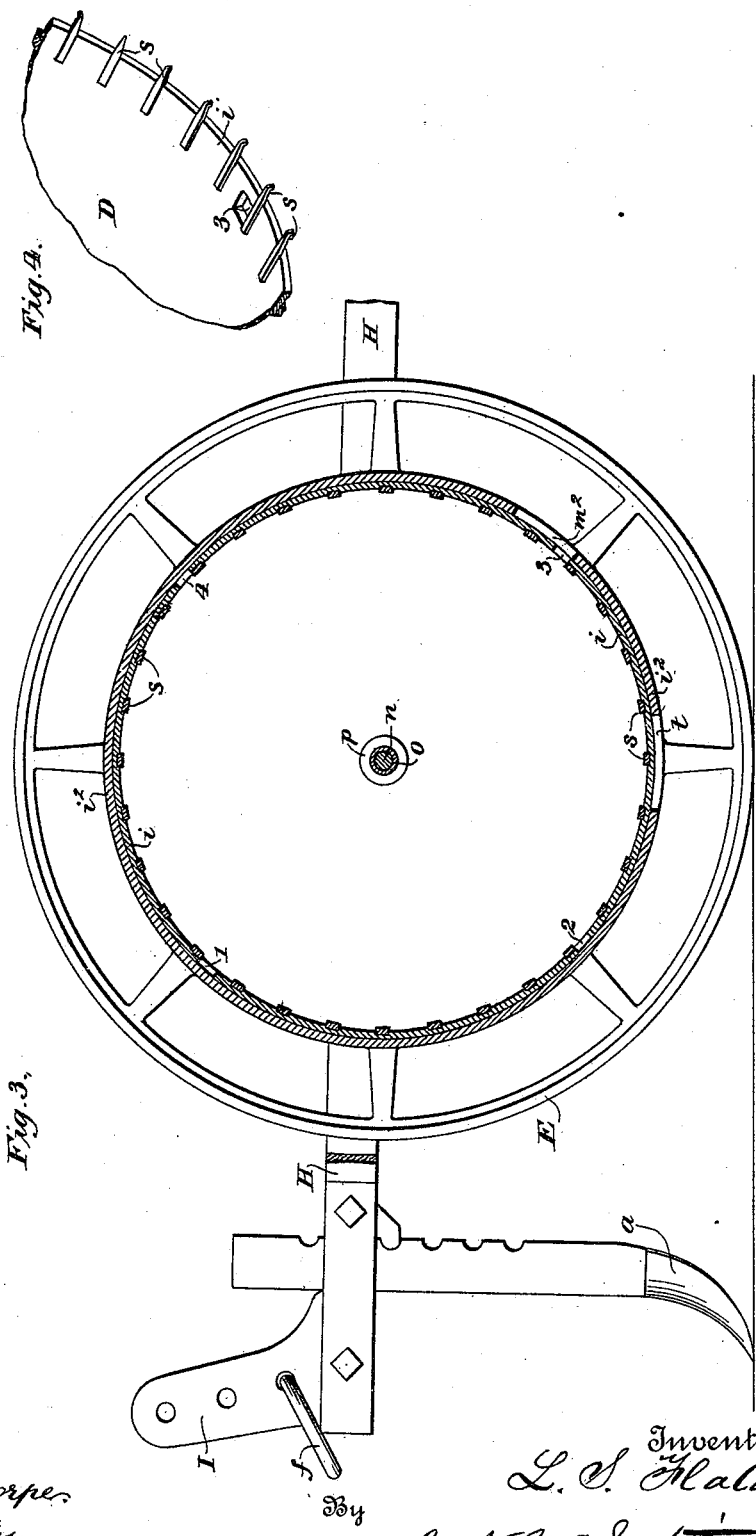

UNITED STATES PATENT OFFICE.

LOUIS S. FLATAU, OF PITTSBURG, TEXAS, ASSIGNOR TO B. F. AVERY & SONS, OF LOUISVILLE, KENTUCKY.

SEED-PLANTER.

SPECIFICATION forming part of Letters Patent No. 464,741, dated December 8, 1891.

Application filed August 26, 1891. Serial No. 403,771. (No model.)

*To all whom it may concern:*

Be it known that I, LOUIS S. FLATAU, of Pittsburg, in the county of Camp and State of Texas, have invented certain new and useful Improvements in Seed-Planters; and I do hereby declare that the following is a full, clear, and exact description of the same, reference being had to the accompanying drawings, forming part of this specification.

My invention relates to that type of planting-machines in which there is used some sort of opener to make a furrow into which the seed are dropped, and some sort of devices which follow after and cover over the seed with a sufficient quantity of earth, and in which there are also means by which the machine may be adjusted so as to either plant cotton or other seed continuously or in drills, or to plant corn, peas, &c., in hills.

Machines of this type have heretofore been made variously constructed, but all of them more or less complicated, and hence rather expensive to make and somewhat liable to get out of working order; and to provide for use a machine adapted to efficiently perform all the operations of the type of planter above referred to, that shall be exceedingly simple and economic of construction, shall possess great durability, and that requires only such shifting or adjustment of parts (to adapt it to either kind of planting) as may be easily managed by the most unskilled person are the main objects of my improved invention, which to these ends may be said to consist, primarily, in a receptacle for the seed composed of a stationary and a rotatory part, the latter provided with a wheel-like device, in combination with any suitable frame provided with a suitable opener and means for adapting the said receptacle to either discharge the seed therein contained in a drill or in hills, as may be required, all as will be hereinafter more fully explained, and, secondarily, in certain other novel structural features to be hereinafter explained, and which will be found particularly pointed out in the claims of this specification.

To enable those skilled in the art to which my invention appertains to make and use machines containing, either in whole or in part, the features constituting said invention, I will now proceed to fully describe the latter, referring by letters and figures to the accompanying drawings, which form part of this specification, and in which I have shown my invention carried into effect in precisely the way in which I have so far practiced it, though in carrying it out a machine may of course be made varying as to mere mechanical changes from that herein shown and described, and embracing less than all of the novel structural features shown in my improved planter.

Figure 2:
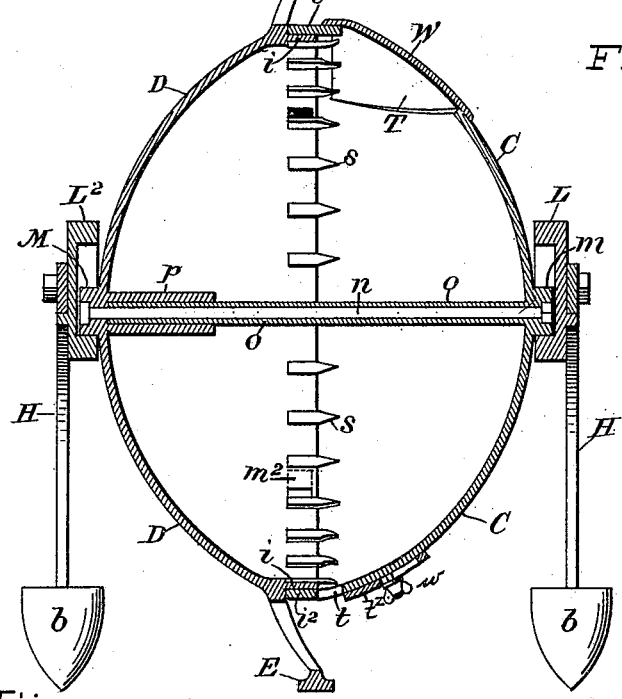

In the drawings, Figure 1 is a perspective view of a machine embracing all the features of my invention. Fig. 2 is a vertical cross-section of the same, taken at a plane passing through the axis of the nearly-spherical seed-receptacle. Fig. 3 is a partial vertical central section taken at a plane transverse to that of Fig. 2. Fig. 4 is a partial perspective view of the rotatory half of the seed-receptacle detached.

In the several views the same part whenever it is visible will be found designated by the same reference-letter.

H is a metallic frame of the preferable shape, provided at the front end, where its convergent beams meet, with a vertical perforated draft-plate I, in any one of the holes of which may be secured an ordinary clevis *f*. The arms or beams of this frame are yoked around or embrace the spherical seed-receptacle C D, as shown, and said frame is provided near its front or leading end with an opener *a*, while its rear ends are curved downwardly after the fashion of plow-standards, and are provided with covering-blades *b b*, all as clearly shown, though the forms and precise arrangement together of the parts composing the frame, with its opener and coverers, may of course be widely varied from what I have shown, since they constitute no novel feature in my planter.

J J are a pair of suitable handles having their lower extremities securely fastened, respectively, to the beams of the frame H, as shown, and being connected higher up to the rearmost portions of said beam by obliquely-arranged metallic braces *e e*, all preferably in the manner shown.

The nearly hemispherically-shaped or the concavo-convex castings C and D, which together constitute the seed-receptacle, are made and arranged so that where they meet each has a sort of equatorial rim, the rim $i$ of D being fitted to turn easily within the rim $i^2$ of C, and these two parts C and D are held together in the direction of their axes by a tie-rod $n$, which is made fast (at one of its ends) in the hub-like device of one of the said castings. That half of the seed-receptacle which is marked C is rendered stationary (with the exception of a capacity to move bodily up and down to a limited extent) by means which will be presently described, while the other half D rotates, as the machine is drawn along over the field, by reason of the rolling contact with the ground at the vicinity of the furrow formed by the opener $a$ of the wheel-like device E, which, in the case shown, is cast integrally with the part marked D. This part D is also cast (see Fig. 2) with an interior axially-arranged long hub $p$, the bore of which constitutes the bearing-surface or journal-box of this part D, which turns on a tubular device $o$, that is fitted on the diametrically-arranged tie-rod $n$ and that serves to hold apart properly the stationary and rotatory parts C and D, that, as before remarked, are prevented from spreading apart by the axially-arranged tie-rod $n$. The bosses or hub-like projections M and $m$ of the parts D and C are respectively mounted to fit loosely in the vertical slots or housings of the two metallic blocks or castings $L^2$ and L, that are respectively secured to the beams of the main frame H, and within these vertical housings these hubs M and $m$ are free to rise and fall to a suitable extent, in order that the seed-receptacle may move bodily up and down while the machine is drawn along, and thus permit the wheel E, which travels in the seed-furrow, to adapt itself to the superficial ups and downs of the ground and always keep the half D of the seed-receptacle (with which said wheel is connected) revolving on its axis of motion.

$t$ is a gated oblong discharge-orifice in the lowermost portion of the stationary part C of the seed-receptacle, through which orifice or aperture the seed to be planted, when the machine is used for drilling the seed, is continuously forced or fed by the action of a series of fingers $s$, which are arranged about equidistant, as shown, on the interior of the rim-like portion $i$ of the rotatory casting D. The discharge capacity of this gated orifice is varied, as the character of the seed and other surrounding circumstances may require, by simply adjusting the gate or cut-off $t^2$, which is held in any desired position by a thumb-nut $w$, and when the machine is to be used to plant corn, peas, or seed in hills this orifice is simply closed up entirely, when another set of devices, which I will now describe, will be brought into action to drop the seed periodically or in hills during the travel of the machine.

In the rim $i$ of the rotatory half D of the spherical seed-holder are a series (in the case shown four) of equidistant perforations 1 2 3 4, which are closed up, so to speak, at their outer ends by the inner periphery of the rim $i^2$ of the stationary casting C, against which periphery the outer surface of the rim $i$ of part D rotates or travels, and thus these apertures in the revolving rim $i$ constitute (at least while they are each positioned below a horizontal diameter of the circular rim $i$) moving receptacles or seed-pockets, that are bottomed by the rim $i^2$, and the seed contained in the lower portion of the spherical chamber formed by the parts C and D will, it will be understood, necessarily fill these pockets as they respectively travel through the mass of seed. It will also be easily understood that as these pockets successively travel upwardly and out of the mass of seed they will carry their contents upwardly to a certain height, and would eventually, however, dump the contained seed back on the top of the mass contained in the chamber; but at the point $m^2$ (see Fig. 3) in the rim $i^2$ of the stationary casting C is formed an oblong discharge-aperture, and as these charged pockets 1 2 3 4 come successively up to or in line (radially of the spherical chamber) with this aperture their contents are allowed to escape therethrough by gravity, and the charges of seed thus falling are of course deposited along at equidistant points in the furrow formed by the opener $a$ and (like seed continuously planted in said furrow) are then covered over by the coverers $b$ $b$. The seed thus planted are discharged, it will be seen, at the rear portion of the machine and in full sight of the attendant of the machine both as they are dropped and after they have fallen into the furrow.

It will be understood that the capacity of each of the pockets 1 2 3 4 may be varied, as may be deemed expedient, by partially filling in or closing up the pocket in any suitable manner, and of course the precise location shown of the discharge-orifice $m^2$ is not essential, though in practice I have found it a desirable if not the best one.

Near the highest point of the stationary casting C there is formed a large opening T for conveniently supplying the receptacle with the seed to be planted, and this supply or feed opening should be provided with a sheet-metal or other suitable cover to close it up during the running or use of the machine to keep any dust or dirt (carried up by the traveling ground-wheel E) from falling into the seed-receptacle.

In lieu of the particular construction shown with reference to the means and manner of retaining the stationary and rotatory parts C and D in the proper relative position, some other construction may be adopted without in the least departing from the maint point or primary part of my invention, and in like manner, so far as the first part of my invention is concerned, it is not at all material that the machine contain the particular means shown for permitting the spherical seed-chamber to move bodily up and down relatively to the frame and for preventing only the part C from revolving, which means consists, as shown, of the vertically-recessed housings L L² and the respectively round and square hubs M and $m$, that are fitted within said housings.

These minor but novel structural features of my improved machine I however consider valuable, though the main feature of novelty, which rests in the idea of the seed-receptacle formed of a stationary and rotatory part combined, as explained, and provided with some suitable means for working, as described, in connection with a device for properly preparing the ground for the reception of the seed, is the most important part of my invention, and may be used separately from or independently of the other novel and minor features of my improved machine.

Having now so fully explained my invention that those skilled in the art can make and use machines embodying either some or all of the separable features thereof, what I claim as new, and desire to secure by Letters Patent, is—

1. In a seed-planter of the type shown and described, the combination, with a suitable frame-work, of a seed-receptacle composed of a stationary part having a suitable discharge-orifice and a rotatory part mounted axially in line and working together, as specified, the said rotatory part being formed or provided with a wheel-like device which by contact with the ground effects the rotation of said part, all in substantially the manner and for the purposes hereinbefore set forth.

2. In a seed-planter of the type herein referred to, the combination, with a suitable frame having an opener and covering devices, of a seed-receptacle composed of a stationary and a rotatory part, as specified, a wheel-like device formed on or attached to the rotatory part, and means for permitting the bodily movement vertically and together of the said rotating and stationary parts of the receptacle, all substantially as and for the purposes set forth.

3. In a seed-planter of the type herein referred to, the combination, with a suitable carrying-frame, of the two-part seed-receptacle, one non-rotative and the other provided with means to rotate it as the machine is drawn along, the external stationary rim $i^2$, having a discharge-orifice $m^2$, and the internal rotatory rim $i$, provided with a series of seed-pockets, all substantially as and for the purposes set forth.

4. In a planter adapted to plant seed either by drilling in rows or in hills, the combination, with the main frame provided with an opener, of the wheeled device D, the stationary part C, the gated and the elevated seed-exits $t$ and $m^2$ in the part C, and the fingers $s$ and seed-pockets 1 2 3 4, with which part D is provided, all in substantially the manner and for the purposes set forth.

In witness whereof I have hereunto set my hand this 14th day of July, 1891.

LOUIS S. FLATAU.

In presence of—
E. H. CALLAHAN,
C. H. ALLMOND.